United States Patent
Buskens et al.

[11] Patent Number: 5,905,871
[45] Date of Patent: May 18, 1999

[54] METHOD OF MULTICASTING

[75] Inventors: Richard Wayne Buskens, North Middletown Township, Monmouth County; Sanjoy Paul, Atlantic Highlands Township, Monmouth County; Muhammad Ali Siddiqui, Parlin Township, Middlesex County, all of N.J.

[73] Assignee: Lucent Technologies Inc., Murray Hill, N.J.

[21] Appl. No.: 08/722,447

[22] Filed: Oct. 10, 1996

[51] Int. Cl.[6] ....................................................... G06F 15/16
[52] U.S. Cl. ................................. 395/200.75; 395/200.68
[58] Field of Search ................................ 455/4.2, 5.1, 8; 370/395, 398, 60.1, 94.2, 94.1, 95.1, 60, 95, 351, 401, 409; 395/200.15, 309, 200.6, 200.61, 200.68, 200.72, 200.75, 200.74; 379/202

[56] References Cited

U.S. PATENT DOCUMENTS

| | | | |
|---|---|---|---|
| 5,063,562 | 11/1991 | Barzilai et al. | 370/94.1 |
| 5,457,680 | 10/1995 | Kamm et al. | 370/17 |
| 5,457,808 | 10/1995 | Osawa et al. | 455/8 |
| 5,541,927 | 7/1996 | Kristol et al. | 370/94.2 |
| 5,606,669 | 2/1997 | Bertin et al. | 395/200.68 |
| 5,652,400 | 7/1997 | Fujimori et al. | 84/600 |
| 5,675,742 | 10/1997 | Jain et al. | 395/200.13 |
| 5,727,002 | 3/1998 | Miller et al. | 371/32 |
| 5,748,736 | 5/1998 | Mittra | 380/21 |
| 5,754,532 | 5/1998 | Dev et al. | 370/250 |
| 5,799,146 | 8/1998 | Badovinatz et al. | 395/182.02 |
| 5,822,523 | 10/1998 | Rothchild et al. | 395/200.17 |
| 5,831,975 | 11/1998 | Chen et al. | 370/256 |
| 5,838,912 | 11/1998 | Poon et al. | 395/200.34 |

OTHER PUBLICATIONS

Lin, J. C., and Paul, S., "RMTP: a Reliable Multicast Transport Protocol", published in the Proceedings of IEEE INFOCOM '96.

*Primary Examiner*—Mehmet B. Geckil

[57] ABSTRACT

A multicasting method transmits data segments, including one or more data packets, over an established global multicast tree from a Sender S to a dynamically changing set of receivers, including at least one unknown Receiver R. In response to a data segment transmission, the Sender S receives a first status signal from the at least one unknown Receiver R (and/or any known Designated Receivers DRs) indicating the addition of and packet reception status of the unknown Receiver R (and/or any known Designated Receivers DRs) which has joined the multicast. In response to the status signals, the Sender S retransmits to the unknown Receiver R (and/or any known Designated Receivers DRs) those packets not received thereat. In this manner the unknown Receiver R (and/or any known Designated Receivers DRs) is added to the multicast session and retransmissions thereto are handled in the same manner as other receivers connected to the multicast session.

26 Claims, 17 Drawing Sheets

SENDER SCHEDULER

TRANSMITTER

RETRANSMITTER

Retransmission Queue

| Packet # | 14 | 10 | 8 | 5 |
|---|---|---|---|---|
| # of Retrans | 1 | 2 | 2 | 1 |
| Address of Req. Rec. | R3 | R1, R2 | R2, R3 | R1 |

STATUS-PROCESSOR

ADVERTISER

Rtt-Ack

RECEIVER CONTROLLER

PKT PROCESSOR

Ack_Sender

ADVERTISEMENT PROCESSOR

Rtt-M

Rtt-Calculator 5,905,871

METHOD OF MULTICASTING

FIELD OF THE INVENTION

The invention relates to multicast protocols for networks, and more particularly, to a multicast protocol method for sending data from a sender location to at least one unknown receiver destination.

BACKGROUND OF THE INVENTION

As the Internet gains popularity and its bandwidth is more heavily utilized, there will be a need to utilize the network resources more efficiently. Multicasting is the fundamental technology which allows such an efficient utilization of the network for applications that need to send the same information to several different destinations. There are multicast applications, such as video conferencing, which involve real-time traffic, and such applications require a strict guarantee on end-to-end latency, but do not require complete reliability.

On the other hand, there is a second type of application, such as software distribution, which does not have any strict limit on end-to-end latency, but complete reliability is a must. The U.S. Pat. No. 5,541,927 entitled "A method of multicasting" by Kristol, Paul and Sabnani, issued on Jul 30, 1996 addresses the applications of the second type, using a single file (bulk data) transport, where complete reliability is the goal and end-to-end latency is not a concern.

In between these two extremes, is a third type of application (e.g., one which uses a continuous byte stream), such as market data distribution. This third type of application has some requirements in terms of end-to-end delay, albeit less stringent than video-conferencing, for example, and at the same time, has high reliability requirements, although complete reliability may be compromised if the end-to-end delay requirements are not satisfied.

What is needed is a protocol which can be used for this third type of application and also for the second type of application, with a continuous byte stream as opposed to a single file, for transmission from a sender to multiple receivers.

SUMMARY OF THE INVENTION

The needs of this third type of application is provided, in accordance with the present invention, by a multicasting method which transmits data segments including one or more data packets, over an established global multicast tree, from a Sender S to a set of receivers including at least one unknown Receiver R. In response to a data segment transmission, the Sender S receives a status signal from at least one unknown Receiver R indicating the existence of and data packet reception status of the unknown Receiver R which has joined the multicast. In response to status signals, the Sender S retransmits to the unknown Receiver R those packets not received thereat.

One feature enables the multicast tree to include a plurality of local trees, which are sub-trees of the global multicast tree, at least one local tree having a Designated Receiver DR associated therewith and having one or more said receivers which report status thereto. The sender then receives status signals from at least one Designated Receiver DR indicating a packet reception status and in response thereto retransmits those data packets not received at the Designated Receiver DR.

According to other features of the method, a Producer (or Data Source) connected to the Sender S may produce blocks of data of the same or varying size or a continuous data stream, from which the Sender S forms the data segments for transmission. Another feature provides a resettable time interval (Td) for the retransmission of data packets.

DETAILED DESCRIPTION

A. General Description of the Reliable Multicast Transport Protocol (RMTP) Protocol In the following description, elements of each figure may have numbers associated therewith, the most significant digit of that number identifies the figure where that element is located (e.g., 103 is located in FIG. 1).

Figure 1:
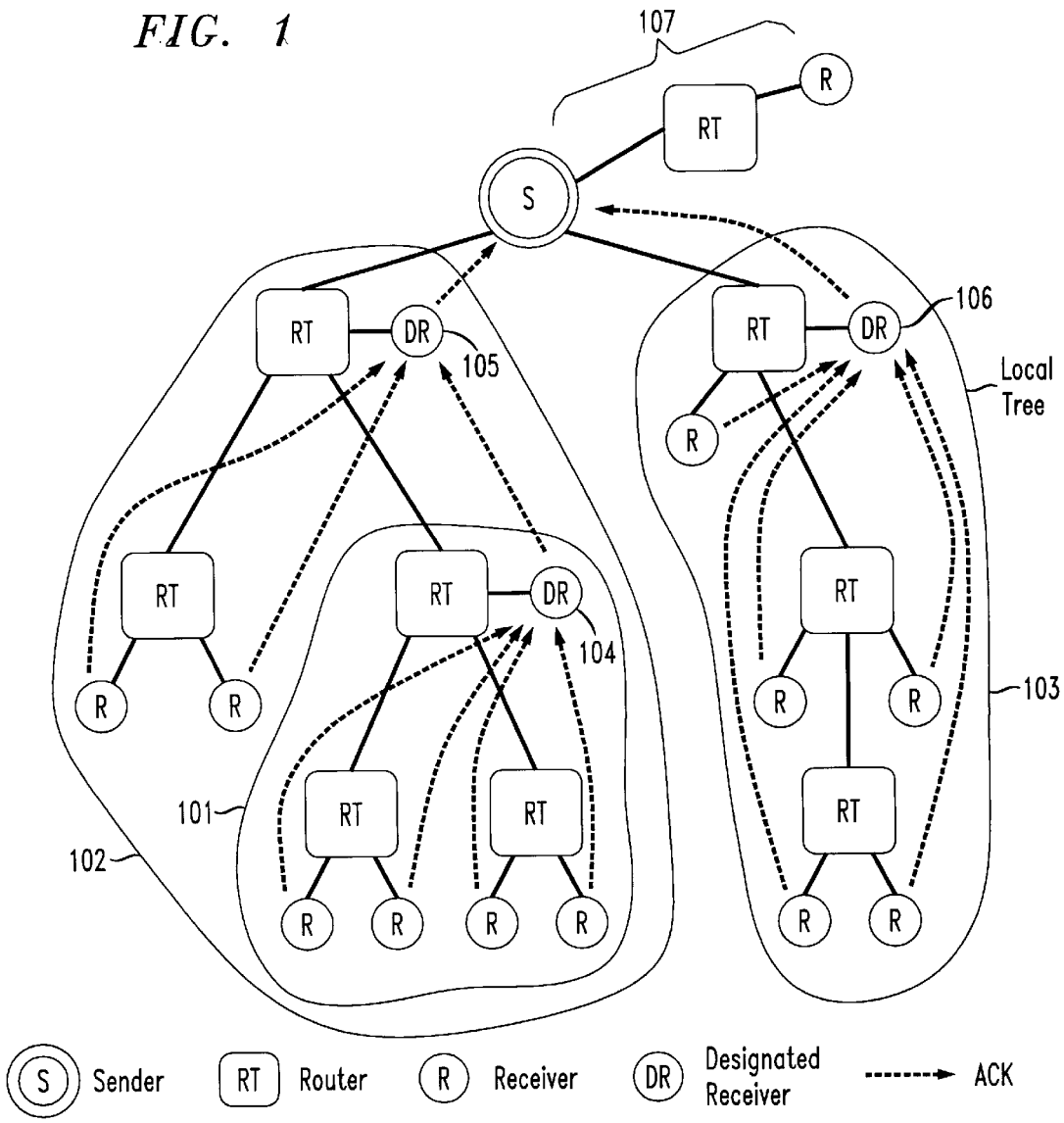
FIG. 1 shows an illustrative multicast delivery system, including a global multicast tree and several local multicast trees, in which the method of our invention may be utilized.

With reference to FIG. 1, multicasting provides an efficient way of disseminating data from a Sender S through a hierarchical layer of routers RT, to a group of Receivers R. Instead of sending a separate copy of the data to each individual Receiver R, the Sender S just sends a single copy to all the Receivers R. The technique used for distributing the data to individual Receivers R is transparent to the Sender S. The Internet, or other types of communication networks may be used as the network to connect the Sender S to the Designated Receivers DR and Receivers R. The Designated Receiver DR is an entity that combines the functionality of a Sender S and a Receiver R. The Designated Receiver DR processes status messages from Receivers R in its local region (or tree) and retransmits lost packets to the Receiver R. Each Designated Receiver DR reports the status of its Receivers R to another higher level Designated Receiver DR or to the Sender S.

Conceptually, the multicast delivery system of FIG. 1 exists in the network-layer (IP-layer in the Internet), and it forms a well known "multicast tree" for connecting the Sender S and the Receivers R, with the Sender S as the root node, each Router RT as an intermediate node, and the Receivers R as the leaf nodes.

The transport layer has a different tree structure, where the Sender S is the root node, Designated Receivers DRs are the intermediate nodes of the "global multicast tree" (or root nodes for local multicast trees), and Receivers R are the leaf nodes. Note that the local multicast trees at the transport layer may actually be physically different from the global multicast tree at the network layer. In the transport level, we use the terms Sender S and Receiver R to indicate the source and destination of data. In our terminology, a Producer is the application level entity which generates data for the Sender S. Similarly, a Consumer is defined as the application level entity which generates data for the Receiver R.

Data generated by the Sender S flows through the multicast tree, traversing each tree edge exactly once. When Receivers R join or leave a multicast group, the multicast tree is dynamically reconfigured. However, the multicast delivery system is a best-effort delivery mechanism and there is no guarantee for reliable delivery of packets. The prior art reliable multicast protocol is a transport-layer protocol designed on top of the multicast delivery system to provide reliability to this point-to-multipoint connection (or session). One prior art reliable multicast protocol for multicasting is described in U.S. patent entitled "A method of multicasting" by Kristol, Paul and Sabnani, issued on Jul. 30, 1996, and incorporated by reference herein.

The RMTP provides reliability, is scalable, and supports heterogeneous network environments and end hosts. Reliability means that every receiver gets an exact copy of the data transmitted by the Sender S. The main techniques used to ensure reliability are the periodic transmission of state by the receivers, and a selective repeat retransmission mechanism used by the Sender S. Scalability is provided in RMTP by grouping receivers into what are called local regions e.g., 101, 102, 103 (using a local multicast tree), each having a Designated Receiver DR,e.g., 104, in each local region to process Acknowledge signals ACKs (also referred to herein as status signals) and perform retransmissions within the local regions. Since the Receivers R send their ACKs to the corresponding DRs in their local region and the DRs send their ACKs to the higher-level DRs (in a multi-level hierarchy) or to the Sender S (in a two-level hierarchy), RMTP avoids the well-known ACK-implosion problem. Note that a receiver may also directly send ACKs to the Sender S (as shown by 107 of FIG. 1). In addition, since lost packets are retransmitted by the DRs in a local region, rather than by the Sender S, end-to-end latency is significantly improved.

The RMTP provides heterogeneity by not making any assumptions about processing power or link bandwidth of the Receivers R. A traditional window-based mechanism is used to limit the injection of new packets in the network and, in addition, the maximum transmission rate of the Sender S may also be configured. More details on flow control in RMTP can be obtained from the article Lin, J. C., and Paul, S., "RMTP: a Reliable Multicast Transport Protocol", appearing in the Proceedings of IEEE INFOCOM '96. The acronym RMTP as used herein henceforth refers to our invention, unless otherwise noted.

Our RMTP also has a capability which allows Receivers R (or Designated Receivers DRs) to join or leave a multicast session while it is in progress. In order to provide this feature, the DRs cache every packet of a session up to a predefined time interval, and as long as a new Receiver R joins the multicast session and the Designated Receiver DR receives the retransmission request from the Receiver R within that interval, the protocol will retransmit packets to this new Receiver R. Another feature allows the Sender S (or Designated Receiver DR) to restart the predefined interval after a retransmission request is received, giving all the Receivers R an additional time period to respond with appropriate status signals.

Our RMTP is a protocol which consists of three finite state machines as in the prior art protocol (referenced in the above-identified Kristol patent), namely, the Sender S, the Receiver R, and the Designated Receiver DR. In addition, there is a timer entity which is used to trigger various protocol events on a periodic basis.

The main features of the RMTP protocol are as follows:
1. Sender S multicasts data packets to all Receivers R and all Designated Receivers DRs using the global multicast tree.
2. Each Designated Receiver DR sends its own status to Sender S in the form of status packets at regular intervals. Each status packet contains information about which packets have been successfully received by a DR. Sender S retransmits a packet either by unicast or multicast depending on the number of DRs and Receivers R that have not received the same packet.
3. Each Receiver R sends its status to the corresponding DR or to the Sender S (e.g., if the Receiver R has no associated DR) at regular intervals. A DR retransmits a lost packet either by unicast or multicast depending on how many receivers in the local region have not received the packet.
4. Sender S advances its window and multicasts new packets provided the DRs and Receivers R have received the packets Sender S sent out in its previous window.

C. Detailed description of the enhanced RMTP protocol

Our RMTP protocol consists of the finite state machines for the Sender S, the Receiver R and the Designated Receiver DR.

1. RMTP Sender S

Figure 2:
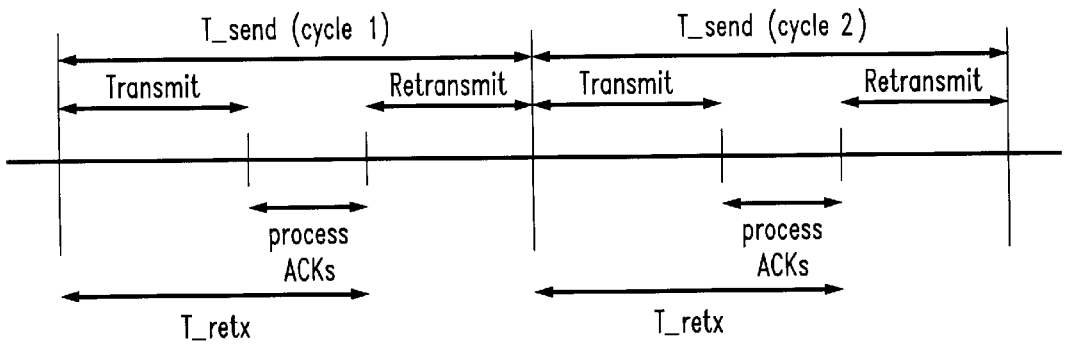
FIG. 2 shows a typical Reliable Multicast Transport Protocol (RMTP) Sender Operation Cycle in accordance with our invention.

With reference to FIG. 2, during a T_send cycle the RMTP Sender S typically does three things: (1) transmit new packets received from a producer(or source) and stores them in a buffer-Sbuff, (2) receive and process status (or acknowledgment ACK) packets, and (3) retransmit lost packets. This sequence of operations is repeated periodically by the Sender S. In addition, the Sender S sends an Advertisement periodically indicating that it can act as a Status Processor. However, the Advertisement is sent less frequently than the three main events (1), (2), and (3) and in addition, it does not depend on them. Therefore, we concentrate on events (1), (2) and (3) only, and show how they interoperate in a typical cycle.

The Sender S finite state machine (or unit), can be thought of as a composition of five components: (1) a Scheduler—FIG. 3, (2) a Transmitter—FIG. 4, (3) a Retransmitter—FIG. 6, (4) a Status Processor—FIG. 8, (5) an Advertiser—FIG. 9, and (6) an Rtt_Ack—FIG. 10.

Figure 3A:
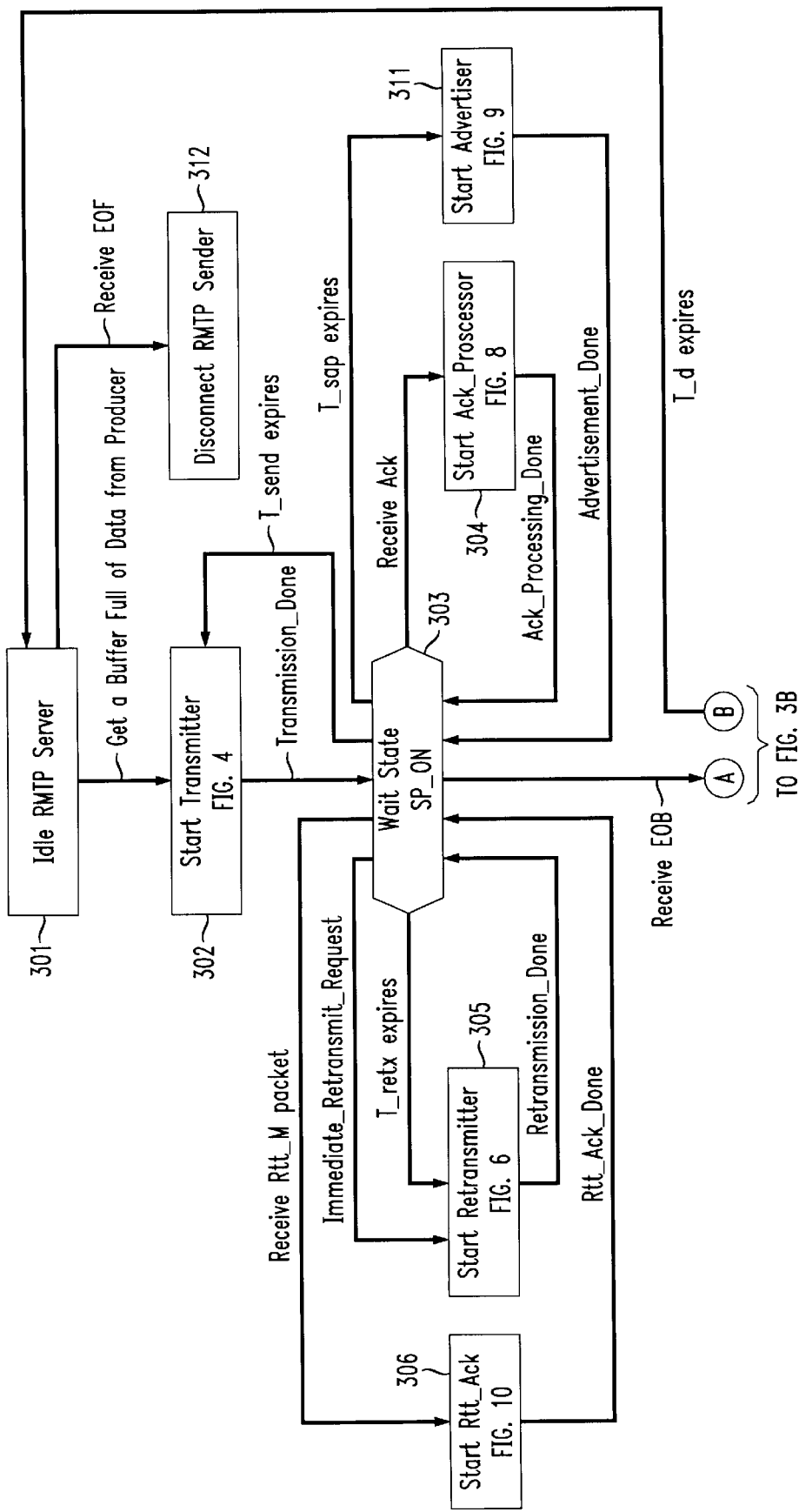
FIG. 3 shows an illustrative flowchart of a Scheduler component of the RMTP Sender.
Figure 3B:
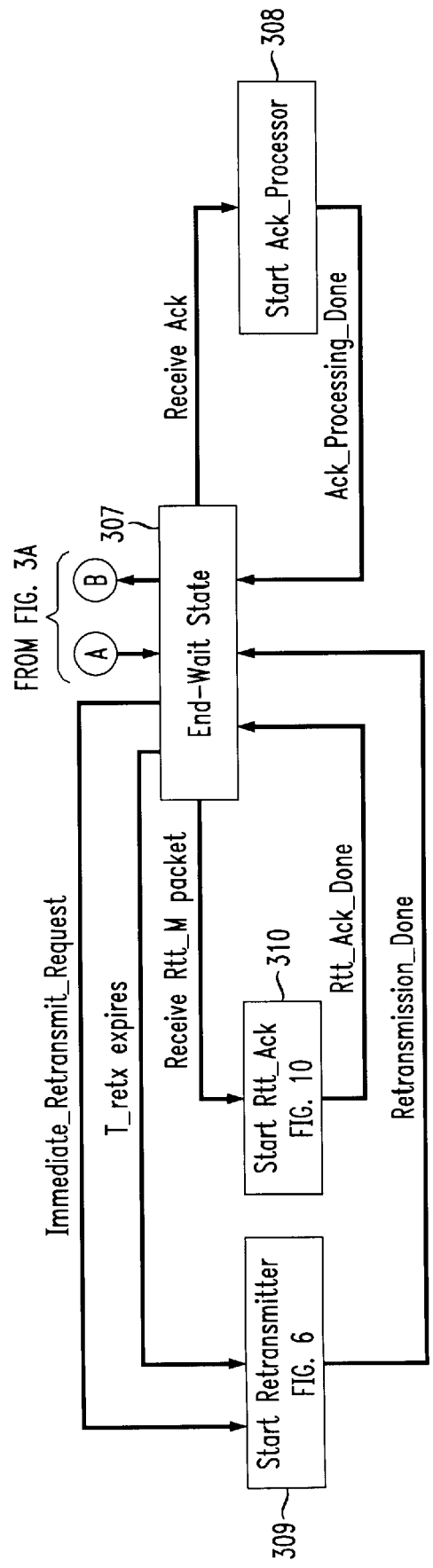

The Scheduler, FIG. 3, coordinates the operation of the various components so that there is no asynchronous operation. The operation of various components are scheduled in a serialized manner, eliminating the need for locking or any sophisticated mechanism to prevent access to critical regions. The Scheduler will be described in a later paragraph after the other components are first described.

Figure 4:
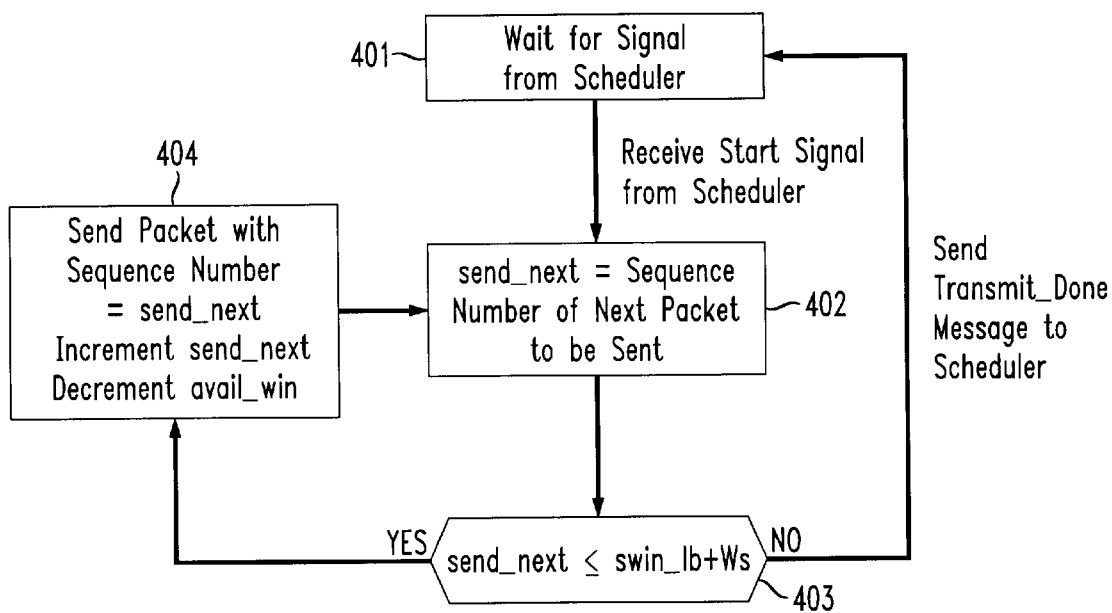
FIG. 4 shows an illustrative flowchart of a Transmitter component of the RMTP Sender.
Figure 5:
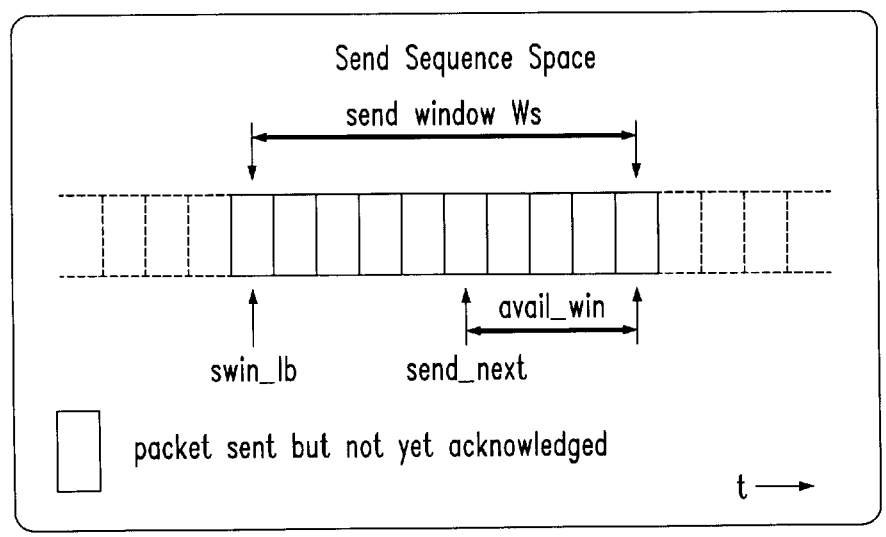
FIG. 5 shows an illustrative diagram of the Send Sequence Space of the RMTP Sender.

The Transmitter component FIG. 4, uses the data structure shown in FIG. 5 to keep track of the Send Window. The Send Window is the maximum number of new packets that can be sent by the Sender S until the Sender S receives status (ACK) packets from Receivers R and Designated Receivers DRs. In particular, the Transmitter uses three variables, swin_lb, send_next, and avail_win for managing the Send Window. As shown in FIG. 5, variable swin_lb records the lower bound of the Send Window, send_next indicates the next sequence number to use when sending data packets, and avail_win is the available window size for sending data. It should be noted that the Transmitter component transmits at most a Send Window Size Ws number of data packets (also referred to herein as a segment of data), unless an EOB (End Of Block) or EOF (End Of File) is received. In FIG. 5, packet transmission proceeds from left to right.

With reference to FIG. 4, the Transmitter component waits in Wait state 401 until it receives a start signal from the Scheduler. In step 402, the sequence number (send_next) of the next packet is determined. In step 403, if send_next is greater than swin_lb+Ws, then a Transmit_Done message is sent to the Scheduler. Otherwise, in step 404 the Transmitter component sends the send_next packet and then increments send_next and decreases avail_win in FIG. 5. The sequence of steps 402, 403, and 404 continue until all the send_next>swin_lb+Ws.

As will be discussed later in the Status Processor, when an acknowledgment message is received, indicating the receipt of a packet(s) with sequence number swin_lb, both swin_lb and avail_win are increased.

Figures 6, 7:
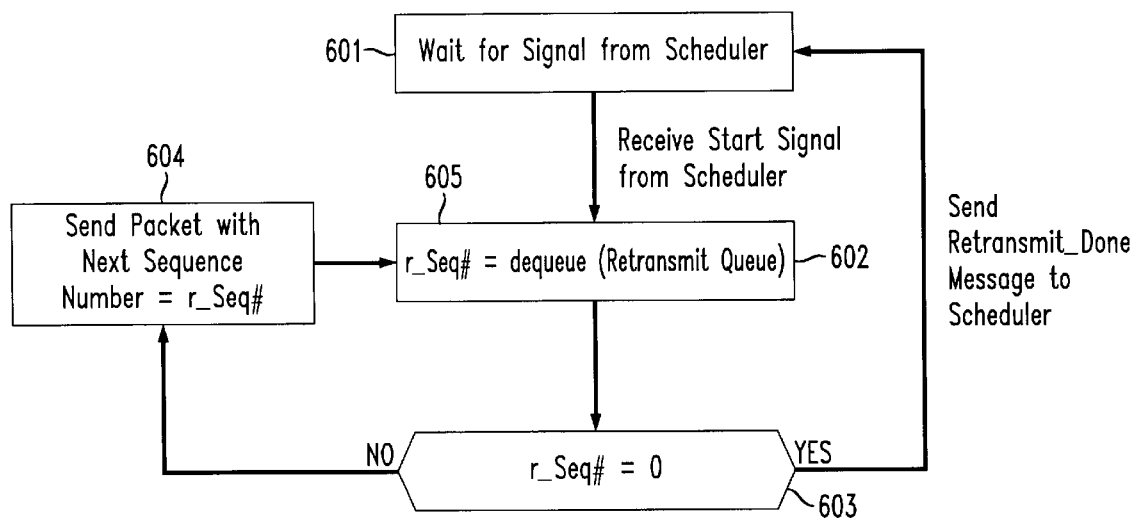
FIG. 6 shows an illustrative flowchart of a Retransmitter component of the RMTP Sender.
FIG. 7 shows an illustrative Retransmit Queue of the RMTP Sender.

The Retransmitter component, FIG. 6, uses the Retransmit Queue data structure shown in FIG. 7 to keep track of the Retransmission Requests. In particular, the Retransmission Queue stores the sequence number of the packets that need to be retransmitted, the addresses of the Requesting Receivers, and the Number of Retransmit Requests. Using this data in the Retransmit Queue, the Retransmitter decides whether a packet should be retransmitted by using unicast (packet(s) are sent separately to each requesting Receiver R), or multicast (packet(s) are sent once to all receivers using the multicast tree).

With reference to FIG. 6, in step 601 the Retransmitter awaits a start signal from the Scheduler. After receiving the start signal, in step 602, the Retransmitter dequeues packets to be retransmitted on receipt of an acknowledgment. For those packets in the Retransmit Queue, it retransmits packets, starting with the packet with the lowest number first from the Retransmit Queue of FIG. 7. In step 603, if there are no remaining Seq# to be transmitted(r_Seq#=0), the retransmission is done and control returns to wait state 601. Otherwise, in step 604, the next packet r_Seq# is sent and control returns to step 605. The steps 603, 604 and 605 are repeated until the Retransmit Queue is empty.

Figure 8:
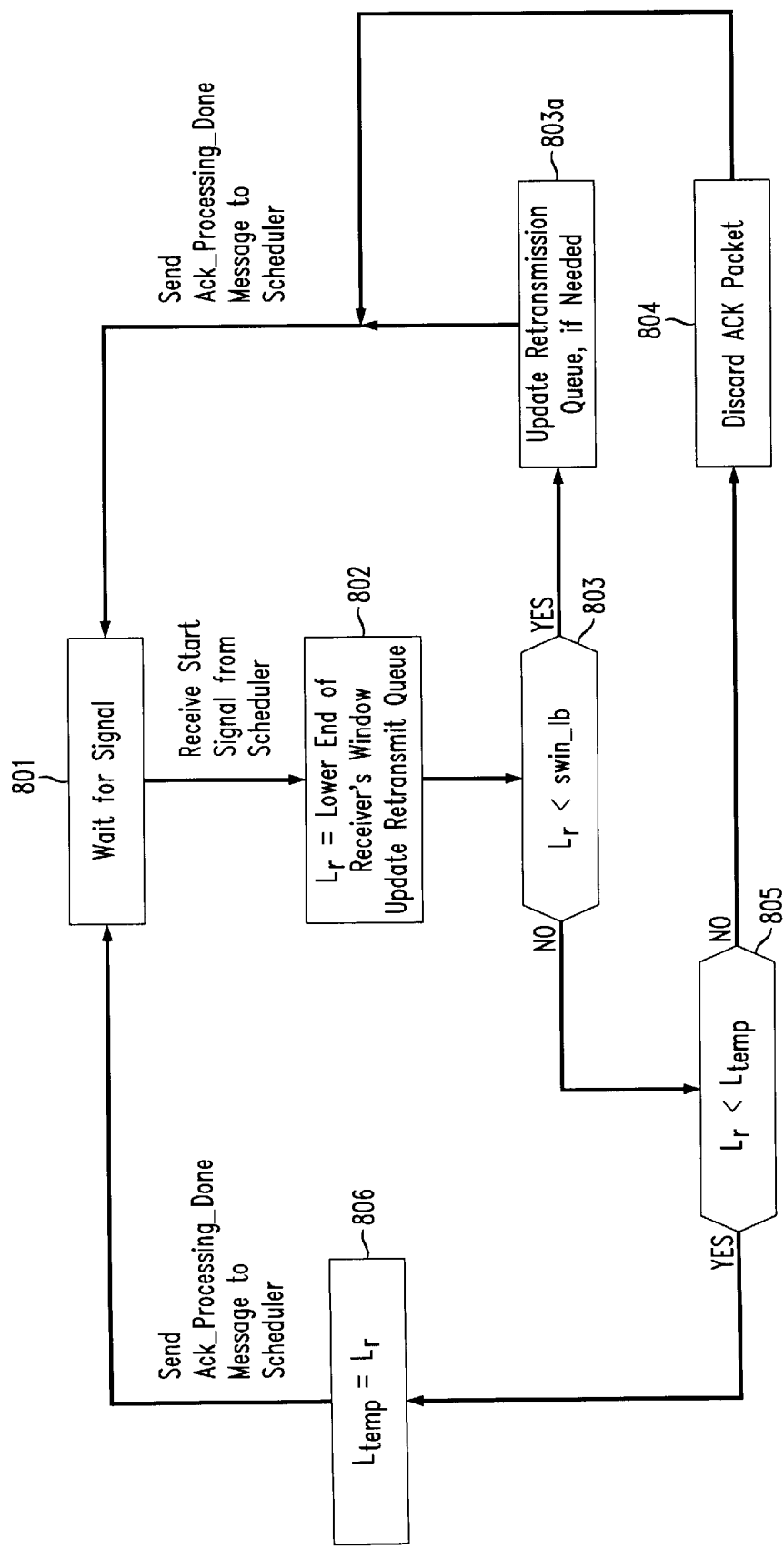
FIG. 8 shows an illustrative flowchart of an Status Processor component of the RMTP Sender.

The Status Processor component, FIG. 8, is responsible for collecting status (acknowledgment) information from the receivers, and updating the Send Window parameters of FIG. 5 and the Retransmit Queue of FIG. 7.

With reference to FIG. 8, the Status Processor component is initially in the wait state 801. After receiving a start signal (T_rack) from the Scheduler, it proceeds to step 802. In step 802, it sets Lr=the lower end of Receiver R's Window (part of the ACK message which triggered the Status Processor) and updates its retransmission queue. In step 803, if Lr<swin_lb, then the ACK packet is discarded, and an Ack_Processing_Done signal is sent to the Scheduler indicating the end of status processing. If Lr is not<swin _lb, then in step 805 it determines if Lr<Ltemp. Ltemp stores the lowest value of Lr within a time interval T_send. The indicator Ltemp is used to update swin_lb (FIG. 5) when T_send expires. If Lr is not less than Ltemp, then the ACK packet is discarded and a signal is sent to the Scheduler indicating the end of Status Processing. If Lr<Ltemp, then in step 806, Ltemp is set to Lr and the Ack_Processing_Done signal is sent to the SchedulerNote that the Sender S updates swin_lb with the value of Ltemp only after T_send expires. Also, sliding the window at the Sender S does not mean that the Sender S discards packets with sequence number lower than swin_lb. These packets are kept in a cache. Furthermore, if a lagging receiver sends an immediate ACK packet with its Lr<swin_lb, Sender S can retrieve the requested packets from the cache and retransmit them.

Figure 9:
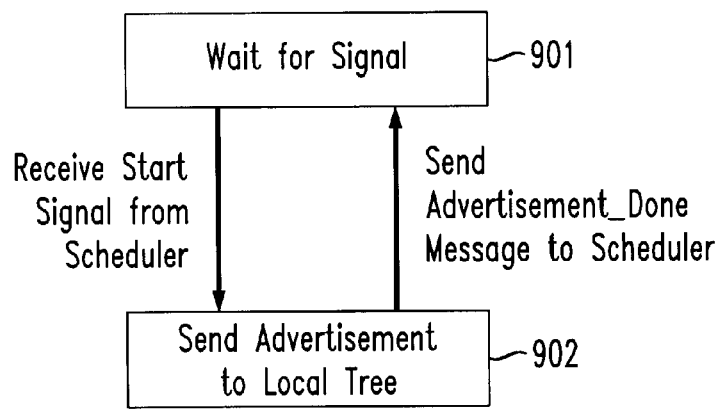
FIG. 9 shows an illustrative flowchart of a Advertiser component of the RMTP Sender.

The role of the Advertiser component, FIG. 9, is to periodically announce to the Receivers R, that the corresponding Sender S can function as an Ack Processor (AP). The term AP is used to denote either the Sender S or a Designated Receiver DR, which can process status messages from the receivers and retransmit lost packets, if necessary.

The Scheduler sends an advertisement message to the DRs and/or Rs, in step 902. (Note, if the Advertiser is part of the DR unit it sends an Advertisement to the Receivers R in its local tree (multicast sub-tree) (e.g., 101 of FIG. 1)). Thereafter, an Advertisement_Done message is sent to Scheduler and control returns to wait state 901.

Figure 10:
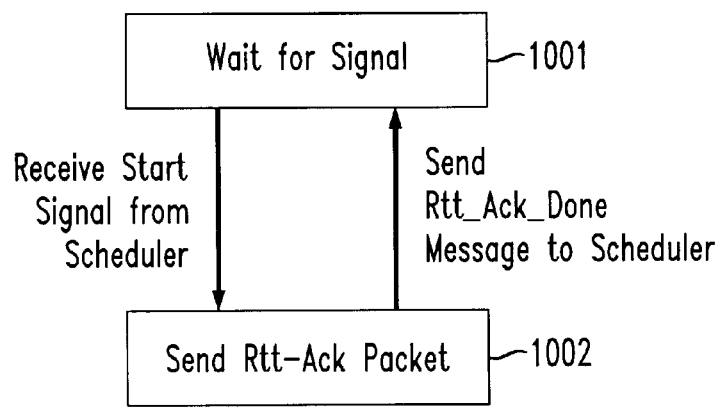
FIG. 10 shows an illustrative flowchart of a Rtt-Acknowledgment component of the RMTP Sender.

The role of the Rtt_Ack component of FIG. 10, is to wait in state 1001 Rtt_M packets from the Scheduler and then to send, in step 1002, an Rtt_Ack packet to the DR and/or R to including the time of reception of an Rtt_M (Measure) packet from a DR and/or R. Thereafter, an Rtt_Ack_Done message is sent to the Scheduler and control returns to wait state 1001.

1a. Scheduler Operation

With reference to FIG. 3, we now describe the operation of the Scheduler and how it interacts with the other Sender S components. Upon receiving the session setup signal, the Scheduler enters the Idle state 301. From the idle state 301, the Scheduler goes to the Start Transmitter state 302 (turning on the Transmitter component FIG. 4,(TX_ON)) when it receives a buffer (Sbuff) full of data packets from the Producer. Thereafter, the Scheduler determines how many of the data packets (also referred to herein as segments) to transmit based on the Send Window parameters of FIG. 5. When transmission is done (Tx_Done), the scheduler goes to wait state 303.

When an incoming ACK message is received, the Scheduler (SP_ON), turns on the Status Processor component (FIG. 8) in step 304, which processes the incoming status (ACK) messages from the Receivers R, updates the Send Window parameters (FIG. 5) of the Sender S, queues up the retransmission requests, and then sends an Ack_Processing_Done signal to the Scheduler which then returns to wait state 303.

On expiration of the retransmission timer (T_retx expires), the Scheduler goes to state 305 (RTX_ON) and turns on the Retransmitter component(FIG. 6), which looks at the Retransmission Queue (FIG. 7) and retransmits lost packets either by unicast or by multicast depending on how many Receivers and DRs acknowledge that they did not receive the packet. The Scheduler can also go to state 305 on receiving an Immediate Retransmit Request signal from a receiver and turn on the Retransmitter.

Figure 11:
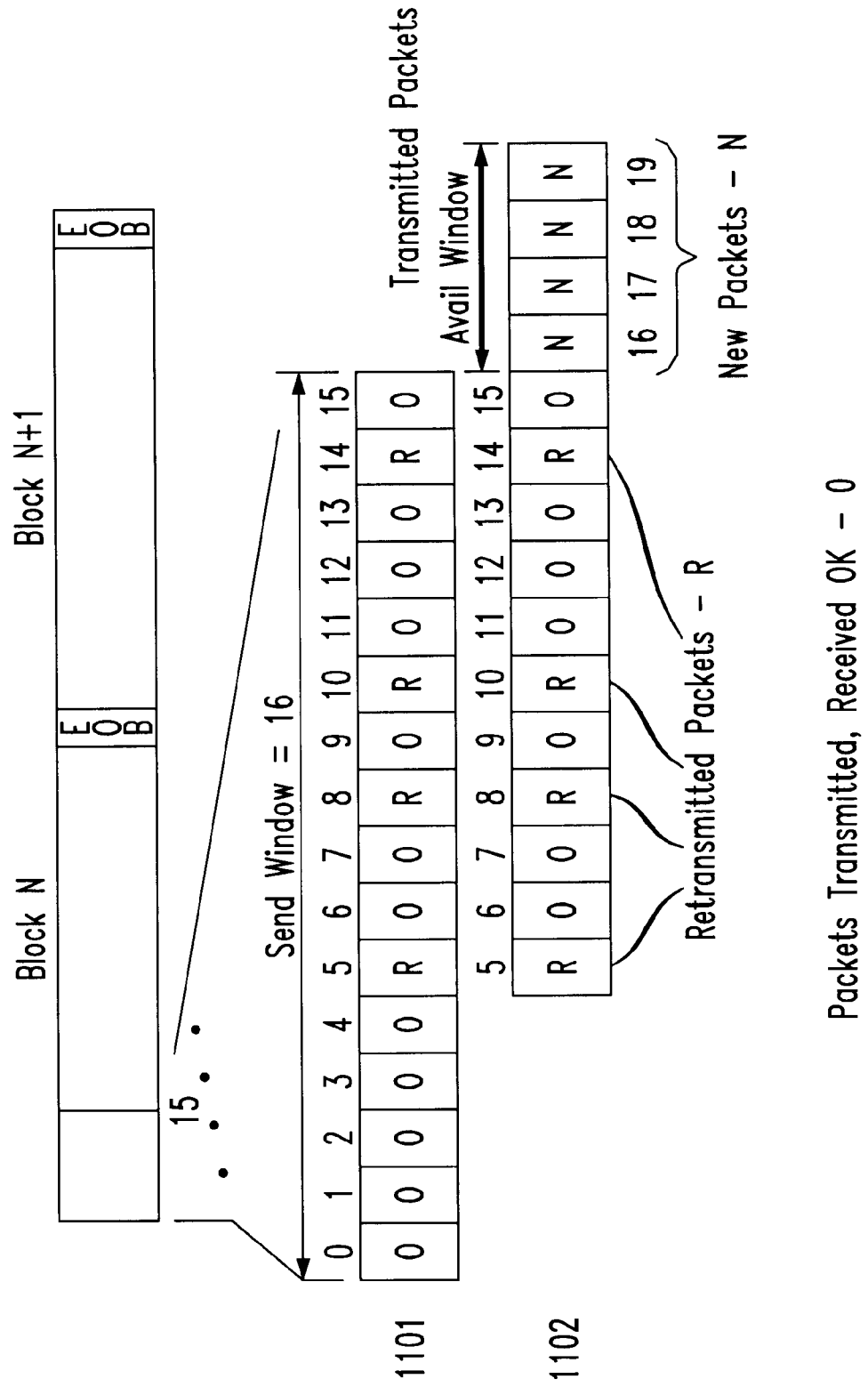
FIG. 11 shows an illustrative transmission and retransmission of a group of data packets.

With reference to FIG. 11, assume that the Sender S is in the midst of transmitting its first window of 16 packets (i.e., Ws=16) of Block N (1101). The Retransmit Queue of FIG. 7 shows that packets 5, 8, 10, and 14 were not received by some of the Receivers. During the Retransmission, 1102, these packets are resent. The new packets 16–19 are sent during the next transmit cycle.

Returning to FIG. 3, after the Retransmission Processing is done, a Retransmission_Done signal causes the Scheduler to go to wait state 303 (SP_ON). If the send timer expired (T_send expires) it goes to state 302.

When the Scheduler is in wait state 303 (SP_ON) and there is an Immediate Retransmission Request (Immediate_Retransmit_Request) from a slow/late Receiver R, the Scheduler turns on the Retransmitter component (RTX_ON), state 305, to retransmit the requested packets. A slow Receiver R is one which is not able to keep up with the Sender S's transmission rate. A late Receiver R is one which joins in the middle of a multicast session.

When the Scheduler is in wait state 303 (SP_ON) and it receives an Rtt_M packet from a Receiver R, it goes to state 306 and activates the Rtt_Ack component (FIG. 10). After receiving an Rtt_Ack_Done signal, the Scheduler returns to wait state 303.

The Scheduler periodically goes from state 303 (SP_ON) to state 311 (ADV_ON), and turns on the Advertiser component (FIG. 9), which sends a special packet to its local tree indicating that it can process status messages from any Receiver R or DR that receives the packet. This feature is useful when there are multiple DRs and a Receiver R has to choose one from them or when a DR fails and the Receivers R need to know where to send their status messages. At the expiration of timer T_sap, the Scheduler returns to state 303.

Figure 20:
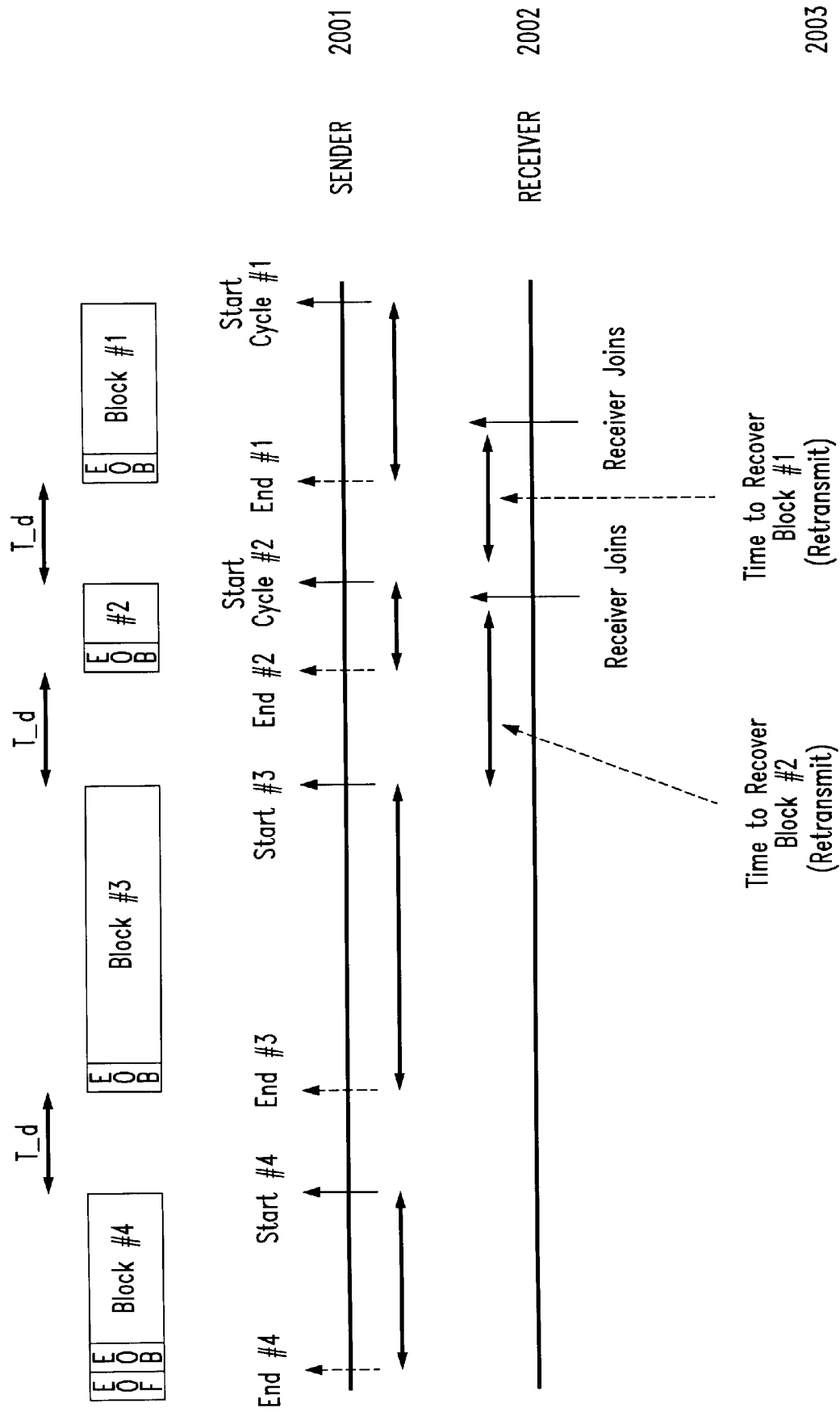
FIG. 20 shows an illustrative timing diagram showing the transmission of data blocks and the joining of receivers to an existing multicast.

A special situation arises when the Scheduler is in wait state 303 (TX_ON) and it receives an End-Of-Block (EOB) marker from the Producer. The Scheduler then goes to the end-wait state 307 (E_SP_ON) and starts a timer called Tdally (T_d of FIG. 20). As is shown in FIG. 20, T_d is the time interval between the EOB and the instant when Sender S stops retransmitting packets from the old block (as shown by 2003). This time interval T_d may be reset by the Scheduler if additional time is needed by any Receiver R or DR that has not yet received all of the packets (indicated by a status (ACK) packet from a Receiver R or DR requesting a retransmission).

During this time T_d, the Scheduler turns on the Status Processor component(FIG. 8), state 308, which updates the Send Window parameters and the Retransmission Queue as before.

As will be discussed in more detail in a later paragraph, and in accordance with a feature of our invention, a Receiver R which is late in joining an existing multicast session, can still receive some, or even all, of the packets that it has missed. This is accomplished during a retransmission period and/or during the interval Td.

On expiration of the retransmission timer (T_retx expires), the Scheduler goes from wait state 307 to end-wait state 309 (E_RTX_ON), in which it turns on the Retransmitter component (FIG. 6) which does retransmissions based on the content of the Retransmission Queue (FIG. 7), as previously described. When this retransmission is over, the Scheduler returns to state 307.

When the Scheduler is in wait state 307 (E_SP_ON) and it receives an Rtt_M packet from a Receiver R or Designated Receiver DR, it goes to state 310 and activates the Rtt_Ack component (FIG. 10). After receiving an Rtt_Ack_Done signal, the Scheduler returns to end-wait state 307.

When T_d expires (T_dally expires), the Scheduler goes from end-wait state 307 back to idle state 301 (TX_ON), and turns on the Transmitter component (FIG. 4) (upon receiving a buffer full of data from the Producer), which starts transmitting packets from a new block.

When an EOF (End-Of-File) marker is received while in state 303, the Scheduler goes to the Disconnected state 312 and terminates the multicast session.

2. RMTP Receiver R

A Receiver R essentially does three things: (1) receives packets (for subsequent output to a Consumer) and updates the receive window, (2) sends ACKs, and (3) calculates round-trip times.

The Receiver R entity is composed of six components: (1) an RMTP Receiver Controller (also referred to herein as Controller)—FIG. 12, (2) a Pkt-Processor—FIG. 13, (3) a Status(Ack)-Sender—FIG. 15, (4) an Advertisement Processor—FIG. 16, (5) an Rtt-measure—FIG. 17, and (6) an Rtt-Calculator—FIG. 18.

The RMTP Receiver Controller of FIG. 12, as will be discussed in later paragraphs, controls the scheduling of operations of the various components of the Receiver R (similar to the function performed by the Scheduler of the Sender S).

Figure 13:
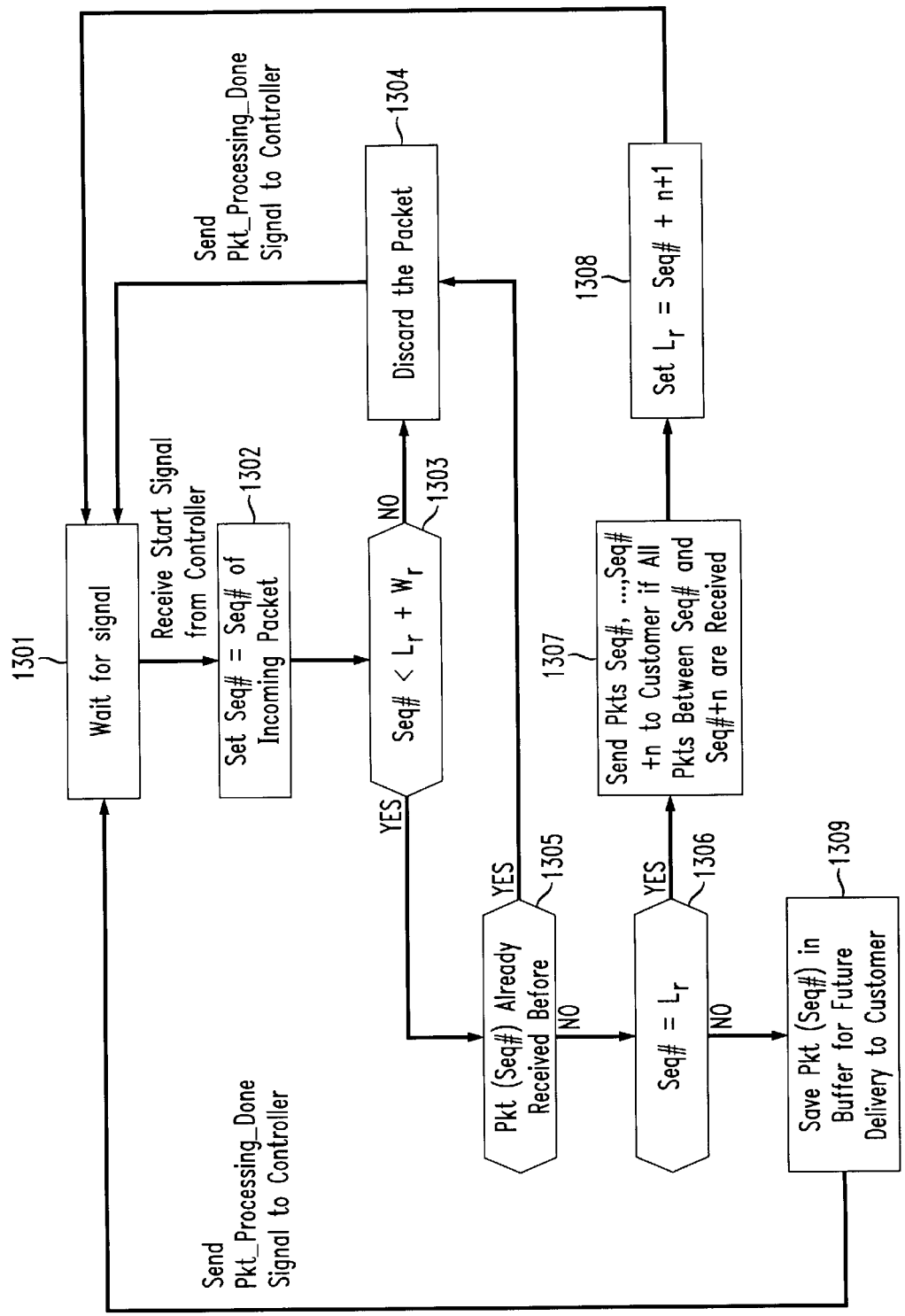
FIG. 13 shows an illustrative flowchart of a Pkt-Processor component of the RMTP Receiver.
Figure 14:
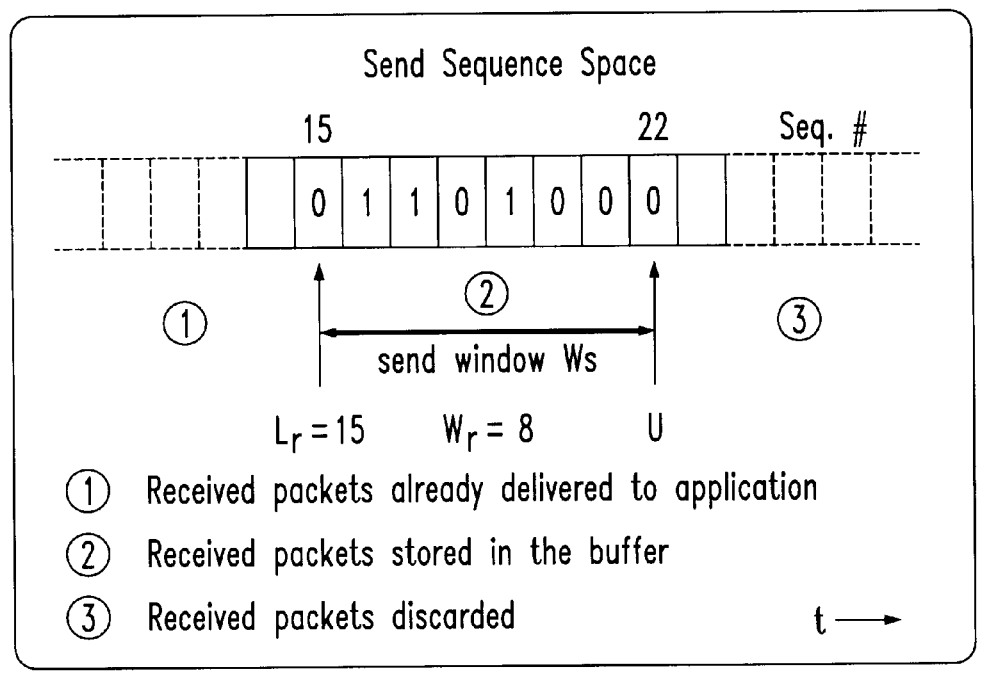
FIG. 14 shows an illustrative diagram of the Receive Sequence Space.

The Pkt-Processor of FIG. 13, is responsible for updating the Receive Sequence Space data structure of FIG. 14 which keeps track of the Receive Window, as a Receiver R receives packets over the multicast tree.

With reference to FIG. 14, the Receive Sequence Space is shown as including the relevant parameters of the Receive Window, such as L, the first packet not yet received, and the Receive Window Size (Wr) of the Receiver R. The Pkt-Processor uses a bitmap of Wr bits to record the existence of correctly received packets stored in the buffer. As illustrated, each bit in the bitmap corresponds to one packet slot in the receive buffer. In the bitmap, a binary bit 1 indicates a packet slot contains a valid data packet and a binary bit 0 indicates no data packet. For example, FIG. 14. shows a receive window of 8 packets; packets 16, 17 and 19 are received correctly and stored in the buffer while packets 15, 18, 20–22 have not been correctly received.

Returning back to FIG. 13, the Pkt Processor is initially in wait state 1301 awaiting a start signal from Controller. Upon receiving a start signal, the Pkt Processor sets the Seq# to the Seq# of the incoming packet, in step 1302. In step 1303, it is determined if the Seq# <Lr +Wr. The term Lr is the lower end of the Receiver R's window. If Seq# is greater than or equal to Lr+Wr, then the incoming packet is discarded in step 1304, and a Pkt-Processing Done signal is sent to the Controller. If the determination in step 1303 is true, then in step 1305 it is determined if the Seq# packet has already been received. If it has, then the packet is discarded in step 1304. If the determination in step 1305 is not true, then in step 1306 the comparison Seq#=Lr is made. If the determination in step 1306 is not true, then in step 1309, the Seq# packet is saved in a buffer for future delivery to a Consumer. If the determination in step 1306 is true, then in step 1307 the packets Seq#, . . . , Seq#+n are sent to the Consumer if all packets between Seq# and Seq# +n are received. In step 1308, Lr is set equal to Seq#+n+1. Thereafter, a Pkt_Processing_Done signal is sent to the Controller, and the Pkt Processor returns to wait state 1301.

Figure 15:
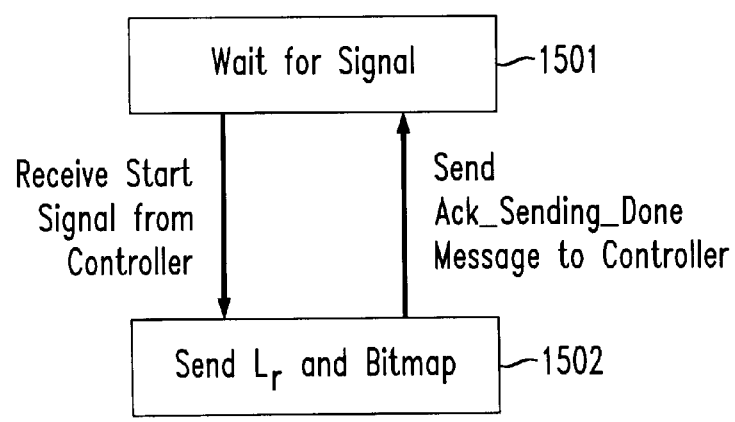
FIG. 15 shows an illustrative flowchart of an Ack-Sender component of the RMTP Receiver.

The Ack_Sender component, FIG. 15 of the Receiver R is responsible for periodically sending the status of the Receiver R to, the Sender S or DR. As shown, while in wait state 1501, after receiving a start signal (T_ack expires) from the Controller (FIG. 12), the Ack_Sender sends, in step 1502, a message to the DR or S. This message includes Lr, the lowest packet number (i.e., the left edge) of the Receive Window, and a bitmap (e.g., bits 15–22 of FIG. 14), indicating which packets within the Receive Window have been received and which ones have not yet been received. Thereafter, an Ack_Sending_Done message is sent to the Controller and the Ack_Sender returns to the wait state 1501.

Figure 16:
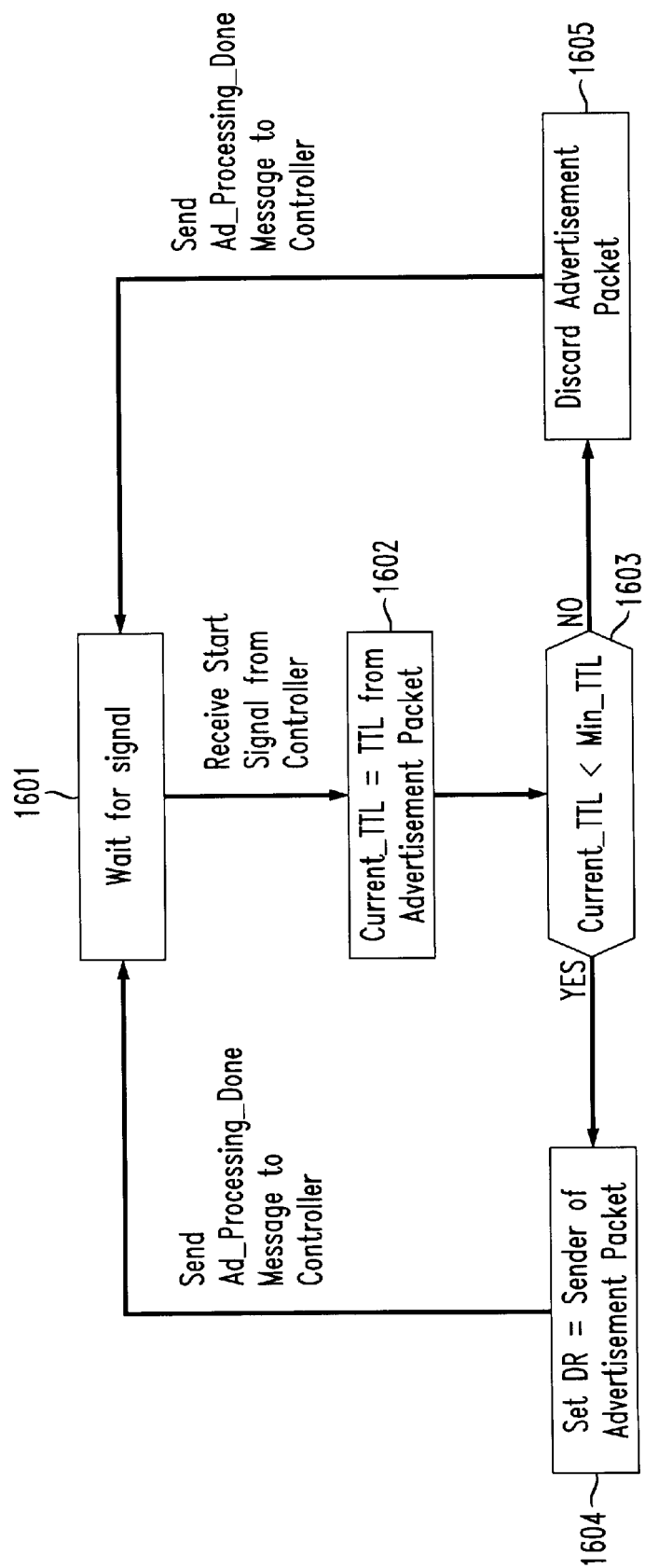
FIG. 16 shows an illustrative flowchart of an Advertisement Processor component of the RMTP Receiver.

With reference to FIG. 16, we describe the operation of the Advertisement Processor which initially is in the wait state 1601. After receiving a start signal from the Controller, in step 1602 it sets the Current_TTL=TTL (Time-To-Live value in an IP-packet of the Internet IP-layer) from the Advertisement packet. If no Advertisement packet is received for sometime, Current_TTL is reset to zero. After Current_TTL is reset, any subsequently received Advertisement packet with a TTL>0 will set the Advertisement Processor to the sender of the corresponding Advertisement packet. In step 1603, if the Current_TTL<Min_TTL (the minimum TTL value of all previous Advertisement packets, since Current_TTL was last reset), then in step 1604, the Advertisement Processor sets DR=sender of this Advertisement packet. Thereafter, a Processing_Done message is sent to the Controller and the Advertisement Processor returns to wait state 1601. If the determination made in step 1603 is not true, then the Advertisement packet is discarded in step 1605, and Advertisement Processing Done message is sent to the Controller and the Advertisement Processor returns to the wait state 1601.

Figure 17:
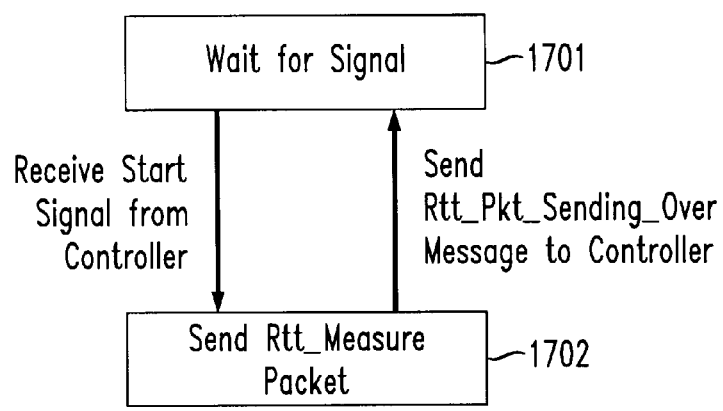
FIG. 17 shows an illustrative flowchart of an Rtt-Measure component of the RMTP Receiver.

The role of the Rtt-M of FIG. 17, is to wait in state 1701 for a periodic start signal (T_rtt) from the Controller and, in response thereto, to send out an Rtt_M packet to the corresponding Ack Processor (AP). Thereafter, an Rtt_Pkt_Sending_Over message is sent to the Controller and the Rtt_M returns to wait state 1701.

Figure 18:
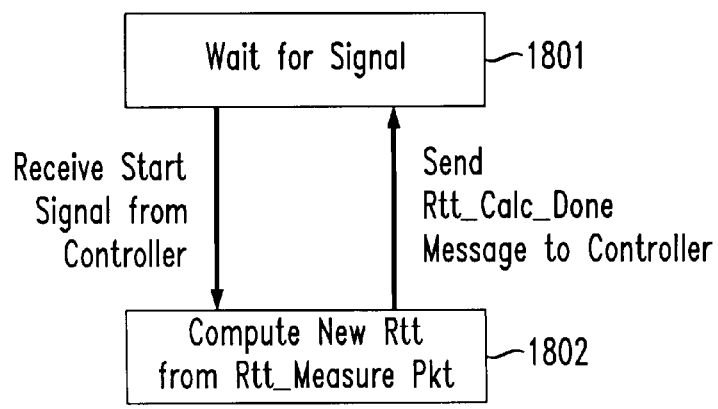
FIG. 18 shows an illustrative flowchart of an Rtt-Calculator component of the RMTP Receiver.

The role of the Rtt-Calculator of FIG. 18 is to wait in state 1801 for a start signal from the Controller (when Rtt_Ack is received) and, in response thereto, to compute a new Rtt based on the value of the current round-trip time, as determined using the data in the Rtt_Ack received from the AP. The Rtt is determined by subtracting the receiving time of the Rtt_Ack packet from the sending time of the Rtt_M packet.

Figure 12A:
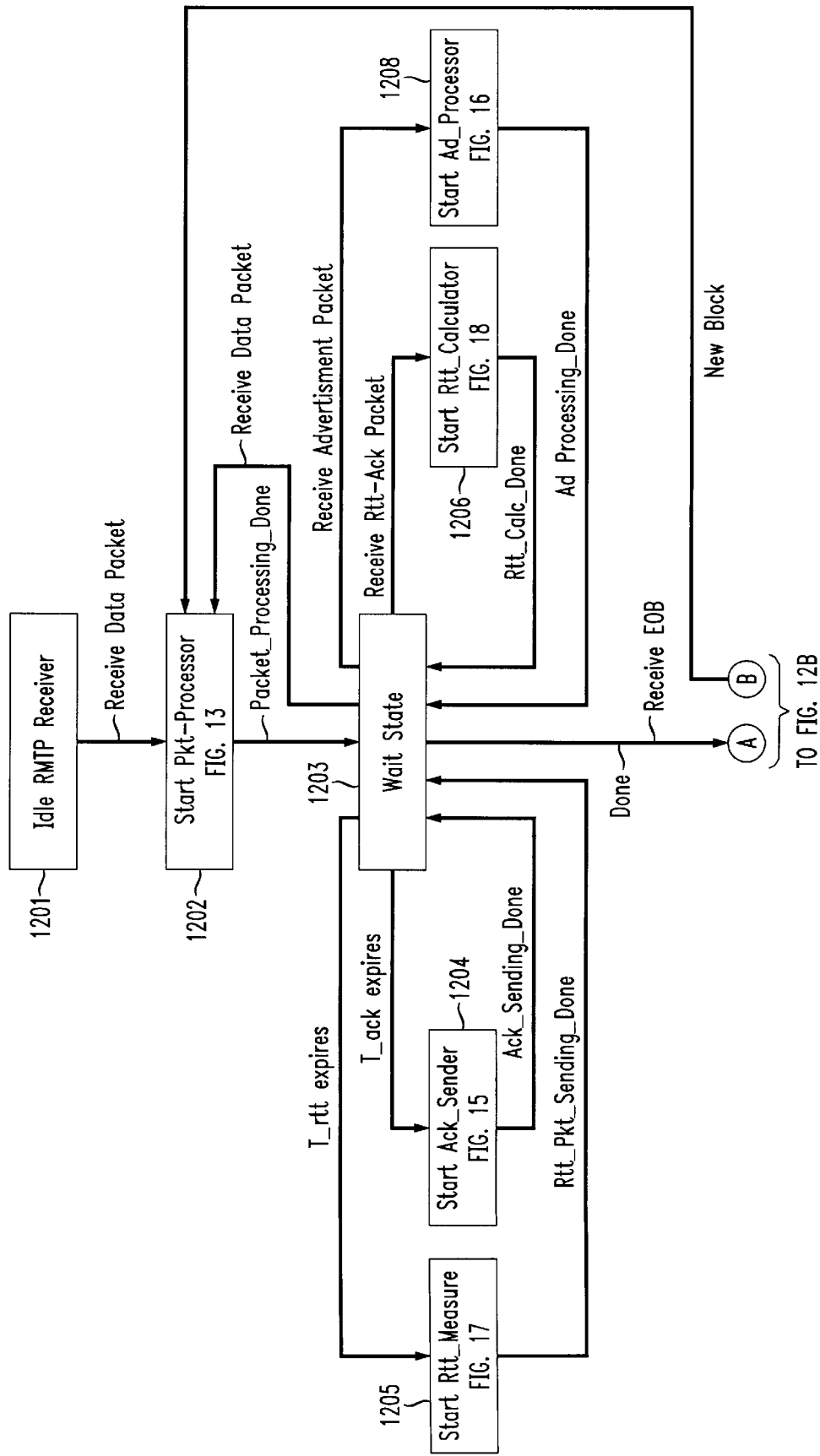
FIG. 12 shows an illustrative flowchart of a Receiver Controller component of the RMTP Receiver.
Figure 12B:
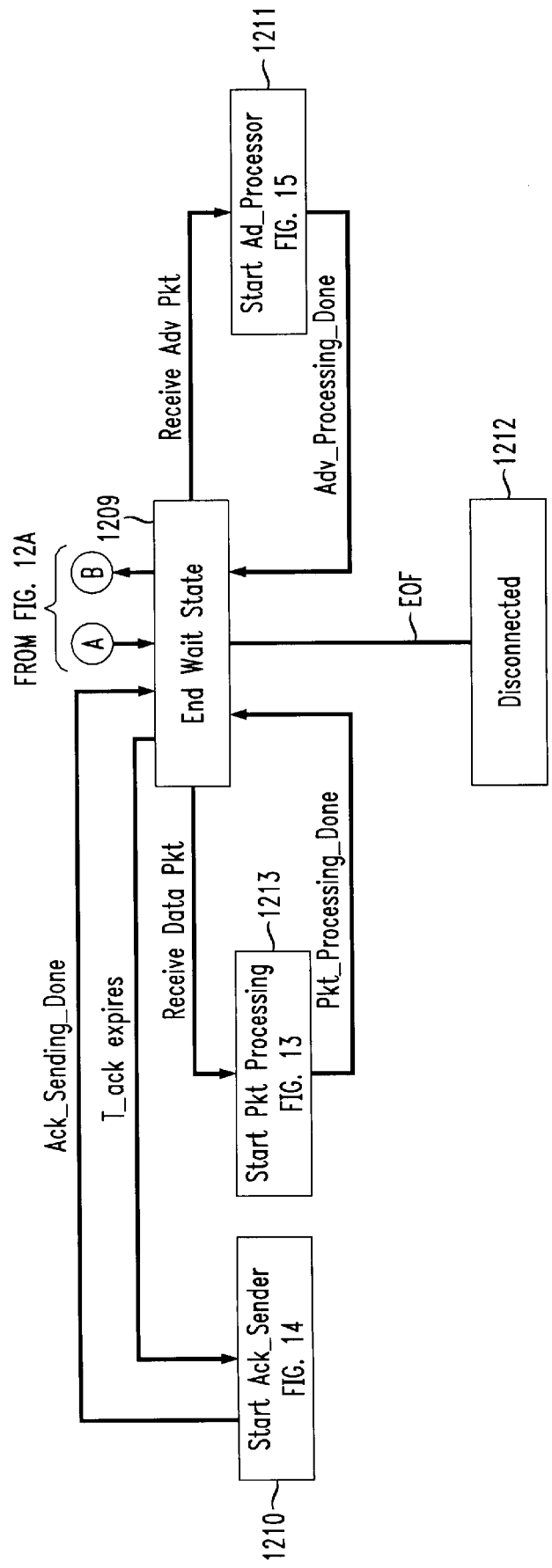

The RMTP Receiver Controller of FIG. 12 is initially in the idle state 1201 when it receives a data packet in a Receiver Sequence Space (FIG. 14). The Controller then goes to state 1202 and starts the Pkt-Processor component of FIG. 13 which starts receiving packets and updating the status of the Receiver R. When packet processing is completed, the wait state 1203 is entered. When the acknowledgment timer expires (T_ack expires), the Controller goes to state 1204 (SS_ON), and turns on the Ack_Sender component of FIG. 15, which sends the lower end Lr of the Receive Window and the bitmap (of FIG. 14) to the Ack Processor, indicating which packets have been received and which packets have not yet been received. When the Ack_Sending is done, the Controller returns to state 1203.

When the round-trip-timer expires (T_rtt expires), the Controller goes to state 1205, in which it turns on the Rtt-Measure component (FIG. 17), which sends an Rtt_Packet to its Ack Processor (AP) to dynamically compute the message round-trip time to the AP. The Controller then returns to state 1203. After receiving an Rtt-Ack Packet, the Controller then goes to state 1206 and turns on the Rtt_Calculator component (FIG. 18) which computes the round-trip time based on the difference of timestamps on the Rtt_Ack and the Rtt_M packets.

When the Controller receives an Advertisement packet indicating that its DR or the Sender S can process acknowledgment messages from any Receiver R that receives data packets, the Controller goes to state 1208 and enables the Advertisement Processor of FIG. 16. After the Advertisement Processor is done processing, the Controller returns to state 1203.

While in state 1203, if the Receiver Controller receives an EOB marker, it goes to end-wait state 1209. In state 1209, as it receives retransmitted packets it goes to state 1213 and starts Pkt Processor. After packet processing is done, control returns to state 1209. In state 1209, when Receiver Controller receives a packet from a new block, it returns to state 1202. However, when the Receiver Controller is in state 1209 and the timer T_Ack expires, it goes to state 1210, and turns on the Ack_Sender component of FIG. 14, which sends the status of the Receiver R to the corresponding AP. When the ACK (or status) sending is done, the Receiver Controller returns to end-wait state 1209.

While in state 1203, if the Receiver Controller receives an Advertisement packet indicating that its DR or the Sender S can process status messages from any Receiver R that receives the packet, the Receiver Controller goes to state 1211 and enables the Advertisement Processor of FIG. 16. After the Advertisement Processor is done processing, the Receiver Controller returns to end-wait state 1209.

While in state 1209, when a Reset message including an End-Of-File (EOF) marker is received by the Receiver Controller, it goes to state 1212 and disconnects the Receiver R from the multicast session.

While in state 1209, when a New Block message is received by the Receiver Controller, it goes to state 1202 and starts the Pkt_Processor.

3. RMTP Designated Receiver

The Designated Receiver DR entity combines the functionality of a Sender S and a Receiver R. In particular, DR receives and processes data packets received from a Sender S, and sends status messages periodically to the Sender S just as any other Receiver R does to its corresponding AP. In addition, DR processes the status messages from the Receivers R in its local region, updates its Retransmission Queue, and then Retransmits lost packets.

The DR entity is composed of eleven components: (1) an RMTP Receiver Controller—FIG. 12, (2) a Pkt Processor—FIG. 13, (3) an Ack_Sender—FIG. 15, (4) an Advertisement Processor—FIG. 16, (5) an Rtt_Measure unit-FIG. 17, (6) an Rtt_Calculator—FIG. 18, (7) a Status Processor—FIG. 8, (8) a Retransmitter—FIG. 6, (9) an Advertiser—FIG. 9, (10) an Rtt_Ack—FIG. 10, and (11) a Scheduler—FIG. 3. The DR is responsible for sending status messages to the Sender S and also for locally re-multicasting packets not received by every Receiver R in the local region.

Figure 19A:
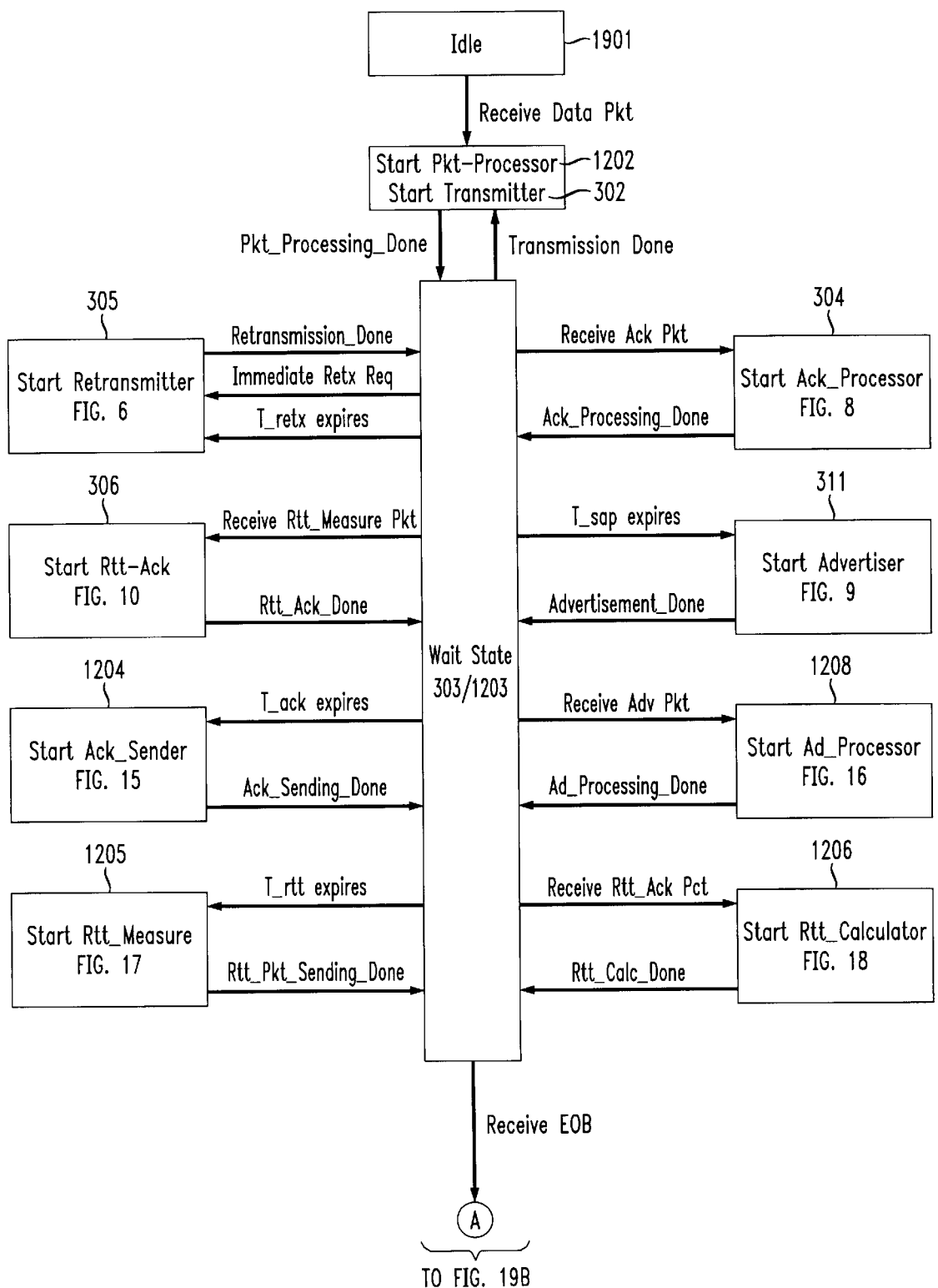
FIG. 19 shows an illustrative flowchart of a Scheduler Controller component of an RMTP Designated Receiver.
Figure 19B:
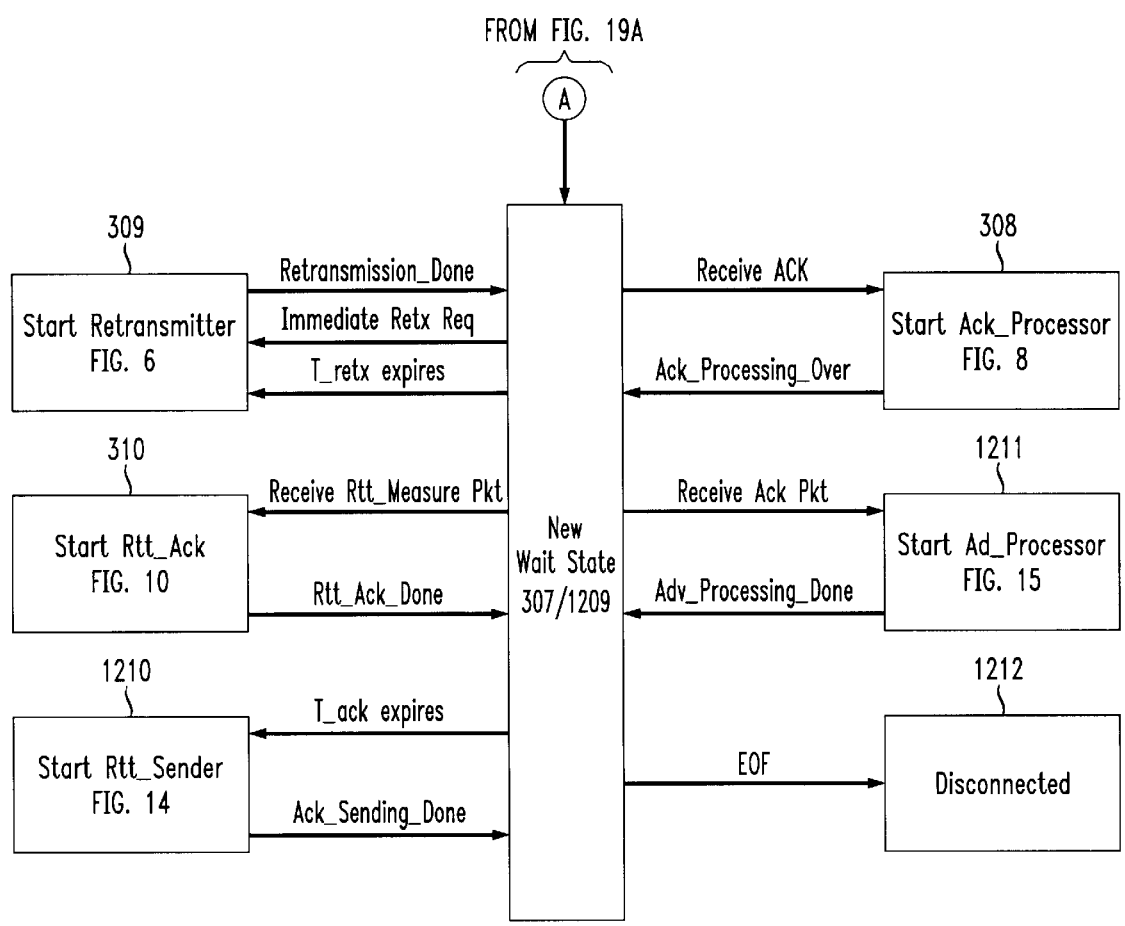

With reference to FIG. 19, it should be noted that the state diagram of the DR is essentially the combination of the components of Sender S of FIG. 3 (as denoted by the numbers 302, 304–306, and 308–311) and Receiver R of FIG. 12 (as denoted by the numbers 1202, 1204–1206, 1208, and 1210–1212). The Wait State is a combination of 303 and 1203, while the New Wait State is a combination of 307 and 1209.

In particular, once the DR goes to Wait state 303/1203, it can perform one of ten possible operations, six of which are event-driven, and the remaining four timer-driven. The six event-driven transitions are:

1. receiving and processing of data packets (1202),
2. receiving and processing of ACKs (304),
3. receiving and processing of immediate ACKs and retransmitting in response to immediate ACKs(305),
4. receiving and processing of advertisement messages from AP upstream (1208),
5. receiving and processing of Rtt_M packets (310), and
6. receiving and processing of Rtt_Acks to calculate round-trip time between itself and its Ack Processor (1206).

The four timer-driven transitions are:
1. sending of ACKs (1204),
2. retransmitting lost packets (305),
3. sending Rtt-M packets (1205), and
4. sending advertisements (311).

When the DR is in the wait state 303/1203, and it receives an EOB, it goes to end-wait state 307/1209, where it can essentially do everything that it could in the wait state. In addition, the DR goes back to the wait state on receiving a complete block, or on receiving a new block. DR starts timer T_d in the end-wait state on receiving an EOF, and goes to a wait state 1203 when T_d expires.

The DR is a Receiver R which has some of the functions of the Sender S. Along with the Sender S, we call the DRs "Ack Processors (AP)," because they process ACKs from Receivers R which are on the local tree. Thus the DR must also store packets for possible retransmission. This storing of received packets is the feature in which the DR is different from either Sender S or Receiver R.

For this purpose the DR maintains a cache, or buffer called DRbuff which is similar to the Sender S's buffer Sbuff.

The DRs also are receivers, and so must function as such. For these reasons, the DR finite state machine appears more complex than those of either the Sender S or Receiver R; but most of its components are nearly identical to either those of the Sender S or the Receiver R. Since the operation of each of these components has been described previously in the context of the Sender S and the Receiver R entities, their operations as part of FIG. 19 will not be further described.

4. Timer Functions

As we have described above, the RMTP entities perform various functions on a periodic basis. For instance, the Sender S invokes the transmitter component periodically, and the Receiver R invokes the Ack_Sender component on a periodic basis. Each of these periods in RMTP are expressed as a multiple of a basic time-out interval.

Various timers are defined based on this basic time-out interval: (1) T_send, (2) T_retx, (3) T_sap, (4) T_ack, (5) T_rtt, and (6) T_d. The time intervals for these timers are defined as a multiple of the basic time-out interval (or tick). Let us denote by N_send, N_retx, N_sap, N_ack, N_rtt, and N_d, the number of ticks corresponding to the time intervals for the timers T_send, T_retx, T_sap, T_ack, T_rtt, and T_d, respectively. Each time the basic time-out interval expires, one tick time is considered to have elapsed, and a counter is incremented. If the value of the counter is divisible by, say, N_send, the timer T_send is considered to have expired.

5. A Typical Operation Cycle of RMTP Sender and Receiver

As shown in FIG. 5, RMTP Sender S transmits new packets until the avail_win is zero. After transmission is over, the Sender S processes the Ack packets that it has already received (during its transmission), and the ones it keeps receiving, until T_send expires. If the retransmission timer T_retx expires and Retransmission Queue has data, Sender S starts retransmitting packets from the Retransmission Queue of FIG. 7.

When T_send expires, Sender S transmits avail_win packets, after updating swin_lb and avail_win based on received status packets.

Receiver R keeps receiving packets, and keeps updating the receive window parameters. Periodically the T_ack timer expires, whereupon Receiver R sends a status packet to its AP. Receiver R also sends Rtt_M packets, less frequently than sending status messages, to estimate the round-trip delay between itself and the corresponding AP, which it can use to update the value of T_ack. This event is triggered on the expiration of T_rtt.

Receiver R outputs packets to the Consumer only when the packets in its buffer are in sequence and equal to the amount of data the Consumer requested.

Continuous Byte-Stream and Flow Control

As mentioned earlier, a Sender S receives a continuous data byte-stream from the Producer. With reference to FIG. 20, the Producer divides the stream into logical blocks (The term "block" will be used instead of "logical block" for the sake of convenience). The Producer puts an EOB (End of Block) marker at the end of each block. Sender S recognizes the EOB marker, and knows it is the end of a block.

At the final block of the byte stream, the Producer places an EOF (End Of File) marker. The final block may be marked by an EOB followed by an EOF or just an EOF. For example, a stream of 20 data packets (represented by the letter D) in which a block boundary is indicated by an EOB looks like

D,D,D,D,D,D,EOB,D,D,D,D,D,D,EOB,D,D,D,EOB,EOF

After the Sender S has transmitted a block containing an EOB marker, it waits for an interval Td, before it starts sending the next block. Note that, if a Receiver R joins the multicast session in the middle of a block transmission, it can receive packets in the block until the Sender S starts transmitting the new block. The Sender S can be configured to restart T_d whenever the Sender S receives an Acknowledgment message from a Receiver R, thereby allowing the Receiver R a longer time to recover packets it has not received.

If a Receiver R cannot recover the current block, Receiver R informs the Consumer(s) that it missed the current block. Otherwise, the Receiver R and the Consumer gets the complete current block.

A multicast session is terminated by the Producer indicating the end of a byte-stream by using a EOF (End of File) marker.

When a Sender S sees the EOF marker, it multicasts a Reset packet to all Receivers R, and as soon as a Receiver R receives the Reset packet, it tears down or disconnects its own session (see 1212 of FIG. 12). This may lead to the Receiver R not receiving the entire current block, which was being multicast by the Sender S. In order to terminate the multicast session gracefully, the producer must first send an EOB marker, and then an EOF marker to the Sender S.

What has been disclosed is merely illustrative of the present invention. Other arrangements can be implemented by those skilled in the art without departing from the spirit and scope of the present invention.

We claim:

1. A multicasting method comprising the steps of:
   from a sender, multicast transmitting segments of data, including one or more data packets, over an established global multicast tree to a dynamically changing set of receivers, including at least one unknown receiver;
   receiving at the sender, a status signal from said at least one unknown receiver indicating a packet reception status of said at least one unknown receiver, and
   in response to said status signal, retransmitting from the sender to said at least one unknown receiver, those packets of data not received by said at least one unknown receiver.

2. The method of claim 1 wherein in response to subsequent status signals from said at least one unknown receiver following subsequent segments of data transmitted from the sender, the sender retransmits those data packets not received by said at least one unknown receiver.

3. The method of claim I wherein said multicast tree includes a plurality of local trees, at least one local tree having a designated receiver associated therewith and having one or more said receivers is assigned to said at least one local tree including, potentially, other unknown receivers and wherein the designated receiver also receives the multicast transmitted segments of data from the sender, potentially, other status signals from said other unknown receivers are received by the designated receiver, these other status signals indicating the addition of said other unknown receivers to the designated receiver's local tree and a packet reception status of the transmitted data segments by said other unknown receivers, and in response to the other status signals, the designated receiver retransmits those packets of data indicated as not received.

4. The method of claim 3 wherein at least one of said at least one designated receivers act as a sender to at least one receiver on its local tree.

5. The method of claim 1 wherein said status signal indicates an addition of said at least one unknown receiver to the multicast tree.

6. The method of claim 1 wherein a producer connected to the sender periodically produces blocks of data of the same or varying size from which the sender forms the segments of data.

7. The method of claim 1 wherein the producer produces a continuous data stream having blocks of the same or varying size.

8. The method of claim 1 wherein the retransmission step has a resettable time interval (T_d) to complete the retransmission step.

9. The method of claim 6 wherein the time interval (T_d) is determined to be at least equal to the maximum round-trip-time delay between the sender and any known receiver.

10. The method of claim 1 wherein the retransmission step retransmits one or more packets to each of one or more receivers based on the data stored in a retransmit queue.

11. The method of claim 3 wherein the retransmission step retransmits one or more packets to each of one or more designated receivers based on the data stored in a retransmit queue.

12. The method of claim 1 wherein at least one receiver sends a status signal periodically, the period based on the round-trip-time measurements for said at least one receiver.

13. The method of claim 3 wherein at least one designated receiver sends a status signal periodically, the period based on the round-trip-time measurements for said at least one receiver.

14. The method of claim 1 wherein when the at least one said status signal indicates a number of receivers needing a particular packet is less than a predefined threshold, the retransmitting step retransmits that particular packet individually to each of said number of receivers.

15. The method of claim 3 wherein when the at least one said status signal indicates a number of receivers and designated receivers needing a particular packet is less than a predefined threshold, the retransmitting step retransmits that particular packet individually to each of said number of receivers and designated receivers.

16. The method of claim 1 wherein when the number of receivers needing a particular packet exceeds a predefined threshold, the retransmitting step multicasts that particular packet to all receivers.

17. The method of claim 3 wherein when the number of receivers and designated receivers needing a particular packet exceeds a predefined threshold, the retransmitting step multicasts that particular packet to all receivers and designated receivers.

18. The method of claim 1 wherein when the sender receives blocks of data packets from a producer which are less than a send window size and a resettable timer T_d is not restarted or a retransmit request received during the T_d interval, then the multicast transmission can satisfy a predetermined end-to-end latency requirement.

19. The method of claim 14 wherein the resettable timer (T_d) to complete the retransmission step at the sender is set at a predetermined maximum.

20. The method of claim 14 wherein the blocks include one or more segments and an End-Of-Block (EOB) signal and wherein the time interval (T_d) is reset after an EOB signal.

21. The method of claim 1 wherein the sender uses information in a retransmit queue to determine if there is a congestion in the network and if congestion is present, it reduces a segment transmission window size at the sender.

22. The method of claim 1 wherein the segments have a predetermined size.

23. The method of claim 1 wherein at least one of the at least one unknown receivers is a designated receiver.

24. The method of claim 19 wherein at least one of the at least one unknown receivers is a late joining receiver which receives data segments from the designated receiver, and wherein the designated receiver retransmits any data segments needed by the late joining receiver.

25. The method of claim 1 wherein the data segment has a predetermined send window size and the data segment is sent during a preset time interval T_send.

26. A multicasting method for an established global multicast tree including one or more local trees each having a designated receiver and a plurality of receivers associated therewith, the method comprising the steps of:

from a sender, transmitting segments of data to the one or more designated receivers and a dynamically changing set of receivers including at least one unknown receiver;

receiving at a designated receiver, a status signal indicating the addition of at least one unknown receiver to its local tree and a reception status for the at least one unknown receiver; and in response to said status signal, retransmitting from said designated receiver to the at least one unknown receiver, those segments of data not received by the at least one unknown receiver.

* * * * *